United States Patent
Li et al.

(10) Patent No.: US 11,985,666 B2
(45) Date of Patent: May 14, 2024

(54) METHOD FOR DETERMINING FEEDBACK RESOURCE IN SIDELINK AND DEVICE

(71) Applicant: Huawei Technologies Co., Ltd., Shenzhen (CN)

(72) Inventors: Xiaocui Li, Beijing (CN); Haibo Xu, Beijing (CN); Yifan Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 366 days.

(21) Appl. No.: 17/422,326

(22) PCT Filed: Jan. 13, 2020

(86) PCT No.: PCT/CN2020/071812
§ 371 (c)(1),
(2) Date: Jul. 12, 2021

(87) PCT Pub. No.: WO2020/143834
PCT Pub. Date: Jul. 16, 2020

(65) Prior Publication Data
US 2022/0110104 A1    Apr. 7, 2022

(30) Foreign Application Priority Data
Jan. 11, 2019   (CN) .................. 201910028788.X

(51) Int. Cl.
*H04W 72/20*    (2023.01)
*H04L 1/1812*   (2023.01)

(52) U.S. Cl.
CPC .......... *H04W 72/20* (2023.01); *H04L 1/1812* (2013.01)

(58) Field of Classification Search
CPC . H04W 56/0045; H04W 56/00; H04W 16/28; H04W 84/04; H04W 88/08;
(Continued)

(56) References Cited

U.S. PATENT DOCUMENTS

2016/0066337 A1  3/2016 Sartori et al.
2017/0347394 A1  11/2017 Yasukawa et al.
(Continued)

FOREIGN PATENT DOCUMENTS

| CN | 104540236 A | 4/2015 |
|---|---|---|
| CN | 105813204 A | 7/2016 |

(Continued)

OTHER PUBLICATIONS

Nokia, et al "Discussions on NR V2X Sidelink Physical Layer Structures," 3GPP TSG RAN WG1 Meeting #95, R1-1813519, Nov. 12-16, 2018, 12 pages.
(Continued)

*Primary Examiner* — Nathan S Taylor
(74) *Attorney, Agent, or Firm* — Conley Rose, P.C.

(57) ABSTRACT

A method for determining a feedback resource in a sidelink includes a first terminal sending SCI to a second terminal, where the SCI includes indication information. The indication information is used to indicate a first resource or a first resource window to be occupied for sending hybrid automatic repeat request HARQ feedback information by the second terminal, and the first resource window includes a plurality of candidate first resources. The method further includes the first terminal receiving, on the first resource, the HARQ feedback information sent by the second terminal, or monitors, in the first resource window, the HARQ feedback information sent by the second terminal.

20 Claims, 7 Drawing Sheets

(58) Field of Classification Search
CPC ... H04W 56/001; H04W 84/06; H04W 72/20; H04W 72/04; H04W 28/04; H04W 92/18; H04B 7/18589; H04B 7/185; H04L 1/1812; H04L 1/1861; H04L 1/1864; H04L 1/1893; H04L 1/1896; H04L 5/0055; H04L 5/0078; H04L 1/1607; H04L 1/18; H04L 1/16; H04L 5/00
See application file for complete search history.

(56) References Cited

U.S. PATENT DOCUMENTS

| | | | |
|---|---|---|---|
| 2020/0092685 A1* | 3/2020 | Fehrenbach | H04W 84/047 |
| 2020/0092692 A1 | 3/2020 | Wang et al. | |
| 2020/0106566 A1* | 4/2020 | Yeo | H04W 28/04 |
| 2020/0112400 A1* | 4/2020 | Lee | H04L 5/0055 |
| 2020/0295810 A1* | 9/2020 | Baldemair | H04L 1/1822 |
| 2020/0295883 A1* | 9/2020 | Lee | H04L 5/0057 |
| 2020/0296749 A1* | 9/2020 | Freda | H04W 72/20 |
| 2021/0029761 A1* | 1/2021 | Jung | H04W 72/02 |
| 2021/0219268 A1* | 7/2021 | Li | H04W 72/20 |
| 2021/0274327 A1 | 9/2021 | Zhao | |
| 2021/0288778 A1* | 9/2021 | Park | H04L 1/1812 |
| 2021/0314796 A1* | 10/2021 | Hoang | H04W 52/36 |
| 2021/0321380 A1* | 10/2021 | Zhao | H04L 5/0055 |
| 2021/0344454 A1* | 11/2021 | Lee | H04L 1/1692 |
| 2022/0006569 A1* | 1/2022 | Lee | H04W 72/02 |
| 2022/0085923 A1* | 3/2022 | Ye | H04L 1/1825 |
| 2022/0094481 A1* | 3/2022 | Hong | H04L 1/1812 |
| 2023/0379891 A1* | 11/2023 | Zhao | H04W 72/044 |

FOREIGN PATENT DOCUMENTS

| | | | | |
|---|---|---|---|---|
| CN | 106797635 A | 5/2017 | | |
| CN | 107079437 A | 8/2017 | | |
| CN | 108923894 A | 11/2018 | | |
| CN | 109075908 A | 12/2018 | | |
| EP | 3836441 A1 | 6/2021 | | |
| EP | 3843311 A1 * | 6/2021 | ......... | H04L 1/1819 |
| EP | 3843311 A1 | 6/2021 | | |
| WO | 2017135998 A1 | 8/2017 | | |
| WO | 2018059282 A1 | 4/2018 | | |

OTHER PUBLICATIONS

Huawei, et al "Design and contents of PSCCH and PSFCH," 3GPP TSG RAN WG1 Meeting #95, R1-1813554, Nov. 12-16, 2018, 8 pages.

CATT,"Discussion on physical layer procedures in NR V2X," R1-1812618, 3GPP TSG RAN1 Meeting #95, Spokane, USA, Nov. 12-16, 2018, 8 pages.

* cited by examiner

METHOD FOR DETERMINING FEEDBACK RESOURCE IN SIDELINK AND DEVICE

CROSS-REFERENCE TO RELATED APPLICATIONS

This application is a National Stage of International Patent Application No. PCT/CN2020/071812 filed on Jan. 13, 2020, which claims priority to Chinese Patent Application No. 201910028788.X filed on Jan. 11, 2019, both of which are hereby incorporated by reference in their entireties.

TECHNICAL FIELD

This application relates to the field of wireless communications technologies, and in particular, to a method for determining a feedback resource in a sidelink (sidelink) and a device.

BACKGROUND

Vehicle to everything (vehicle to everything, V2X) is a key technology for a future intelligent transportation system. V2X applications may include vehicle to vehicle (vehicle to vehicle, V2V), vehicle to infrastructure (vehicle to infrastructure, V2I), vehicle to pedestrian (vehicle to pedestrian, V2P), and vehicle to network (vehicle to network, V2N). The V2X applications can improve driving safety, reduce traffic congestion and vehicle energy consumption, improve traffic efficiency; and enrich in-vehicle entertainment information.

In a V2X application scenario, a schematic diagram of a network architecture for communication between terminals may be shown in FIG. 1a or FIG. 1b. A terminal 1 and a terminal 2 may communicate with each other through a sidelink. There are two modes for resource allocation in the sidelink: Mode 1 (mode 1): A network device determines, for the terminal, a resource to be used in sidelink communication. For example, as shown in FIG. 2a, both a terminal 1 and a terminal 2 are located within coverage of a base station, and can communicate with the base station in a timely manner. In this case, the base station may determine a resource to be used when the terminal 1 communicates with the terminal 2. Mode 2 (mode 2): The terminal autonomously determines a resource to be used in sidelink communication. For example, as shown in FIG. 2b, neither a terminal 1 (a transmitting end) nor a terminal 2 (a receiving end) is currently within coverage of a base station, and can communicate with the base station in a timely manner. In this case, the base station usually pre-configures a resource pool for the terminal 1 and the terminal 2, and the terminal 1 autonomously determines a resource to be used for sending data to the terminal 2.

However, there is no effective solution to hybrid automatic repeat request (hybird automatic retransmission request, HARQ) feedback in the sidelink communication.

SUMMARY

This application provides a method for determining a feedback resource in a sidelink, and a device, to resolve a problem of how a receiving end and a transmitting end determine a HARQ feedback resource in sidelink communication.

According to a first aspect, this application provides a method for determining a feedback resource in a sidelink, including:

a first terminal sends sidelink control information SCI to a second terminal, where the SCI includes indication information, the indication information is used to indicate a first resource or a first resource window to be occupied for sending hybrid automatic repeat request HARQ feedback information by the second terminal, and the first resource window includes a plurality of candidate first resources; and the second terminal sends the HARQ feedback information to the first terminal on the first resource, or sends the HARQ feedback information to the first terminal in the first resource window; and correspondingly, the first terminal receives, on the first resource, the HARQ feedback information sent by the second terminal, or monitors, in the first resource window, the HARQ feedback information sent by the second terminal.

In the foregoing method embodiment, the first terminal may determine the resource occupied for sending the HARQ feedback information by the second terminal, or the second terminal may select, from the resource window indicated by the first terminal, the resource occupied for sending the HARQ feedback information, to implement a HARQ feedback in sidelink communication.

In a possible implementation, when the indication information is used to indicate the first resource occupied for sending the HARQ feedback information by the second terminal, before that a first terminal sends SCI to a second terminal, the method further includes: The first terminal monitors SCI sent by another terminal; the first terminal determines, based on the monitored SCI, a second resource occupied for sending HARQ feedback information by the another terminal, where the another terminal is a terminal other than the first terminal; and the first terminal determines the first resource based on the second resource.

The foregoing implementation helps avoid a conflict between the first resource occupied for sending the HARQ feedback information by the second terminal to the first terminal and a resource occupied for sending other HARQ feedback information.

In a possible implementation, when the indication information is used to indicate the first resource window for sending the HARQ feedback information by the second terminal, the indication information includes one or more types of the following information: a size of the first resource window, a start position of the first resource window, and an end position of the first resource window.

In a possible implementation, when a first message is used to indicate the first resource window for sending the HARQ feedback information by the second terminal, the method further includes: The first terminal receives the size of the first resource window that is sent by a network device; or the first terminal receives a plurality of candidate sizes of the first resource window that are sent by a network device, and the first terminal selects the size of the first resource window from the plurality of candidate sizes of the first resource window.

In a possible implementation, that the second terminal sends the HARQ feedback information to the first terminal in the first resource window includes: The second terminal sends the HARQ feedback information to the first terminal on a first resource in the first resource window, where an energy value monitored by the second terminal on the first resource is not greater than a preset threshold. In this manner, when selecting the first resource from the first resource window, the second terminal selects a resource whose energy value is not greater than the preset threshold as the first resource. When the energy value is not greater than the preset threshold, it may be considered that no other terminal sends a message on the resource. Therefore, a conflict between the resource for sending the HARQ feedback information by the second terminal and the resource for sending the message by the another terminal is avoided.

In a possible implementation, that the second terminal sends the HARQ feedback information to the first terminal on the first resource in the first resource window; where an energy value monitored by the second terminal on the first resource is not greater than a preset threshold includes:

That the second terminal monitors an energy value on a first candidate first resource in the first resource window, and if the energy value on the first candidate first resource is not greater than the preset threshold, uses the first candidate first resource as the first resource, or if the energy value on the first candidate first resource is greater than the preset threshold, monitors an energy value on a second candidate first resource in the first resource window, until an energy value monitored on an $N^{th}$ candidate first resource is not greater than the preset threshold, and uses the $N^{th}$ candidate first resource as the first resource, where N is an integer greater than or equal to 1; and the second terminal sends the HARQ feedback information to the first terminal on the first resource.

In a possible implementation, the second terminal may further determine a third resource occupied for sending data by the second terminal to a third terminal; and the second terminal determines the first resource based on the third resource. Therefore, a conflict between the HARQ feedback information sent by the second terminal to the first terminal and the message sent by the second terminal to the third terminal is avoided.

In a possible implementation, the first terminal and/or the second terminal are/is outside coverage of a network device.

According to a second aspect, this application provides a method for determining a feedback resource in a sidelink, including:

That a first terminal monitors SCI sent by another terminal, and determines, based on the monitored SCI, a first resource occupied for sending data by the another terminal, and the first terminal sends data to a second terminal on a second resource, where the second resource is determined based on the first resource; correspondingly, the second terminal receives the data on the second resource, and the second terminal sends HARQ feedback information to the first terminal on a third resource, where the third resource is determined based on a mapping relationship between the second resource and the third resource; and correspondingly, the first terminal receives, on the third resource, the HARQ feedback information sent by the second terminal.

According to a third aspect, an embodiment of this application provides a method for determining a feedback resource in a sidelink, including:

A first terminal monitors a first message sent by another terminal, where the first message includes information used to indicate a first resource occupied for sending a second message by the another terminal, and the first terminal sends a third message to a second terminal on a second resource; correspondingly, the second terminal receives the third message on the second resource, and the second terminal sends a fourth message to the first terminal on a third resource, where the third resource is determined based on a mapping relationship between the second resource and the third resource; and correspondingly, the first terminal receives, on the third resource, the fourth message sent by the second terminal.

According to a fourth aspect, an embodiment of the application provides a terminal, and the terminal includes:

a sending unit, configured to send SCI to a second terminal, where the SCI includes indication information, the indication information is used to indicate a first resource or a first resource window to be occupied for sending HARQ feedback information by the second terminal, and the first resource window includes a plurality of candidate first resources; and a receiving unit, configured to: receive, on the first resource, the HARQ feedback information sent by the second terminal, or monitor, in the first resource window, the HARQ feedback information sent by the second terminal.

In a possible implementation, when the indication information is used to indicate the first resource occupied for sending the HARQ feedback information by the second terminal, before the sending unit sends the SCI to the second terminal, the receiving unit is further configured to monitor SCI sent by another terminal. The terminal further includes a determining unit, configured to: determine, based on the monitored SCI, a second resource occupied for sending HARQ feedback information by the another terminal, where the another terminal is a terminal other than the first terminal; and determine the first resource based on the second resource.

In a possible implementation, when the indication information is used to indicate the first resource window for sending the HARQ feedback information by the second terminal, the indication information includes one or more types of the following information: a size of the first resource window, a start position of the first resource window, and an end position of the first resource window.

In a possible implementation, when the first message is used to indicate the first resource window for sending the HARQ feedback information by the second terminal, the receiving unit is further configured to: receive the size of the first resource window that is sent by a network device, or receive a plurality of candidate sizes of the first resource window that are sent by a network device. The terminal further includes a selection unit, configured to select the size of the first resource window from the plurality of candidate sizes of the first resource window.

In a possible implementation, the terminal and/or the second terminal are/is outside coverage of the network device.

According to a fifth aspect, an embodiment of this application provides a terminal, including:

a receiving unit, configured to receive sidelink control information SCI sent by a first terminal, where the SCI includes indication information, the indication information is used to indicate a first resource or a first resource window to be occupied for sending hybrid automatic repeat request HARQ feedback information by the second terminal, and the first resource window includes a plurality of candidate first resources; and a sending unit, configured to: send the HARQ feedback information to the first terminal on the first resource, or send the HARQ feedback information to the first terminal in the first resource window.

In a possible implementation, when the indication information is used to indicate the first resource window for sending the HARQ feedback information by the second terminal, the indication information includes one or more types of the following information: a size of the first resource window a start position of the first resource window, and an end position of the first resource window.

In a possible implementation, the sending unit is specifically configured to send the HARQ feedback information to the first terminal on a first resource in the first resource window, where an energy value monitored by the receiving unit on the first resource is not greater than a preset threshold.

In a possible implementation, the receiving unit is specifically configured to: monitor an energy value on a first candidate first resource in the first resource window, and if the energy value on the first candidate first resource is not greater than the preset threshold, use the first candidate first resource as the first resource, or if the energy value on the first candidate first resource is greater than the preset threshold, monitor an energy value on a second candidate first resource in the first resource window, until an energy value monitored on an $N^{th}$ candidate first resource is not greater than the preset threshold, and use the $N^{th}$ candidate first resource as the first resource, where N is an integer greater than or equal to 1.

In a possible implementation, the terminal further includes a determining unit, configured to determine a third resource occupied for sending data by the second terminal to a third terminal; and determine the first resource based on the third resource.

In a possible implementation, the first terminal and/or the second terminal are/is outside coverage of a network device.

According to a sixth aspect, an embodiment of this application provides a terminal, including a processor and a communications interface. The processor is coupled to a memory and the communications interface.

The communications interface is configured to communicate with another device.

The processor is configured to run an instruction or program in the memory, to perform the following steps:

sending, through the communications interface, sidelink control information SCI to a second terminal, where the SCI includes indication information, the indication information is used to indicate a first resource or a first resource window to be occupied for sending hybrid automatic repeat request HARQ feedback information by the second terminal, and the first resource window includes a plurality of candidate first resources; and receiving, through the communications interface on the first resource, the HARQ feedback information sent by the second terminal, or monitoring, in the first resource window, the HARQ feedback information sent by the second terminal.

In a possible implementation, when the indication information is used to indicate the first resource occupied for sending the HARQ feedback information by the second terminal, the processor is further configured to: before sending the SCI to the second terminal through the communications interface, monitor, through the communications interface, SCI sent by another terminal; determine, based on the monitored SCI, a second resource occupied for sending HARQ feedback information by the another terminal, where the another terminal is a terminal other than the first terminal; and determine the first resource based on the second resource.

In a possible implementation, when the indication information is used to indicate the first resource window for sending the HARQ feedback information by the second terminal, the indication information includes one or more types of the following information: a size of the first resource window, a start position of the first resource window, and an end position of the first resource window.

In a possible implementation, when the first message is used to indicate the first resource window for sending the HARQ feedback information by the second terminal, the processor is further configured to: receive, through the communications interface, the size of the first resource window that is sent by a network device; or receive, through the communications interface, a plurality of candidate sizes of the first resource window that are sent by a network device, and select the size of the first resource window from the plurality of candidate sizes of the first resource window.

In a possible implementation, the first terminal and/or the second terminal are/is outside coverage of the network device.

According to a seventh aspect, an embodiment of this application provides a terminal, including a processor and a communications interface. The processor is coupled to a memory and the communications interface. The communications interface is configured to communicate with another device.

The processor is configured to run an instruction or program in the memory, to perform the following steps:

receiving, through the communications interface, sidelink control information SCI sent by a first terminal, where the SCI includes indication information, the indication information is used to indicate a first resource or a first resource window to be occupied for sending hybrid automatic repeat request HARQ feedback information by the second terminal, and the first resource window includes a plurality of candidate first resources; and sending, through the communications interface, the HARQ feedback information to the first terminal on the first resource, or sending the HARQ feedback information to the first terminal in the first resource window.

In a possible implementation, when the indication information is used to indicate the first resource window for sending the HARQ feedback information by the second terminal, the indication information includes one or more types of the following information: a size of the first resource window, a start position of the first resource window, and an end position of the first resource window.

In a possible implementation, the processor is specifically configured to: send, through the communications interface, the HARQ feedback information to the first terminal on a first resource in the first resource window, where an energy value monitored on the first resource through the communications interface is not greater than a preset threshold.

In a possible implementation, the processor is specifically configured to: monitor, through the communications interface, an energy value on a first candidate first resource in the first resource window, and if the energy value on the first candidate first resource is not greater than the preset threshold, use the first candidate first resource as the first resource, or if the energy value on the first candidate first resource is greater than the preset threshold, monitor an energy value on a second candidate first resource in the first resource window, until an energy value monitored on an $N^{th}$ candidate first resource is not greater than the preset threshold, and use the $N^{th}$ candidate first resource as the first resource, where N is an integer greater than or equal to 1; and send, through the communications interface, the HARQ feedback information to the first terminal on the first resource.

In a possible implementation, the processor is further configured to: determine a third resource occupied for sending data by the second terminal to a third terminal; and determine the first resource based on the third resource.

In a possible implementation, the first terminal and/or the second terminal are/is outside coverage of a network device.

The terminal may be a chip, and the memory may be an on-chip memory or an off-chip memory.

According to an eighth aspect, an embodiment of this application provides a computer-readable storage medium. The computer-readable storage medium stores a computer instruction, and when the instruction is run on a computer, the computer is enabled to perform a function performed by the first terminal in any method in the first aspect to the third aspect, or the computer is enabled to perform a function performed by the second terminal in any method in the first aspect to the third aspect.

According to a ninth aspect, an embodiment of this application provides a computer program product including an instruction. When the computer program product runs on a computer, the computer is enabled to perform a function performed by the first terminal in any method in the first aspect to the third aspect, or the computer is enabled to perform a function performed by the second terminal in any method in the first aspect to the third aspect.

According to a tenth aspect, this application provides a chip. The chip is connected to a memory, and is configured to read and execute a software program stored in the memory, to implement a function performed by the first terminal in any method in the first aspect to the third aspect, or to implement a function performed by the second terminal in any method in the first aspect to the third aspect.

DESCRIPTION OF EMBODIMENTS

To make objectives, technical solutions, and advantages of this application clearer, the following further describes this application in detail with reference to the accompanying drawings.

Currently, in a 3rd generation partnership project (3rd generation partnership project, 3GPP) meeting discussion, it has been determined that a HARQ feedback can be supported in both unicast and multicast scenarios in sidelink communication. Specifically, in a HARQ feedback technology, when decoding fails, a receiver saves received data and requires a sender to retransmit data, and the receiver combines the retransmitted data with the previously received data and then decodes data. For example, a sending terminal may send data to a receiving terminal on a sidelink resource, and the receiving terminal sends HARQ feedback information to the sending terminal by using a physical sidelink feedback channel (physical sidelink feedback channel, PSFCH) in a sidelink, to indicate whether the receiving terminal correctly receives the data. If the HARQ feedback information indicates that the receiving terminal does not correctly receive the data, the sending terminal resends the data.

However, currently, there is no clear solution to how to determine a resource for sending HARQ feedback information by a terminal that receives data.

To resolve the foregoing problem, the embodiments of this application provide a method for determining a feedback resource in a sidelink, so that a receiving end and a transmitting end can determine a HARQ feedback information resource in sidelink communication.

Figure 1A:
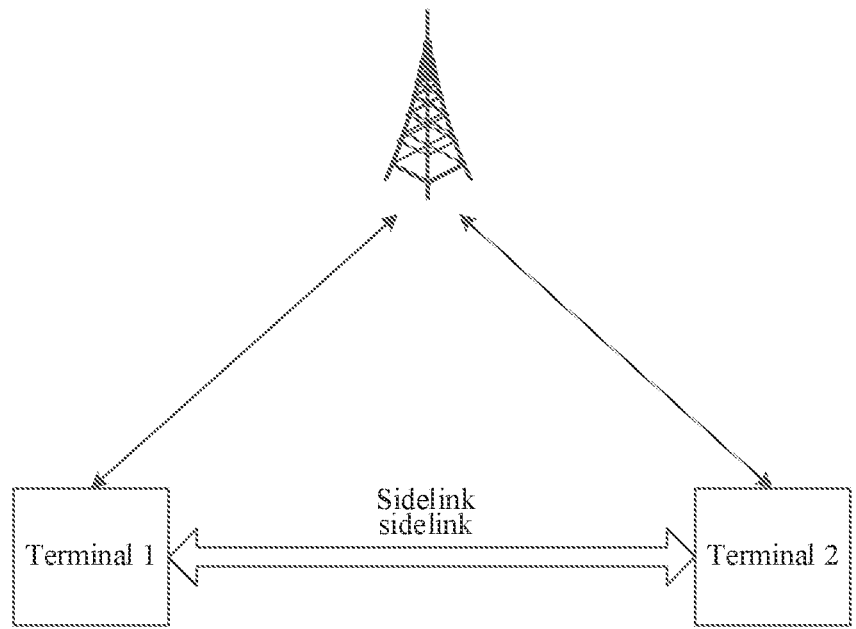
FIG. 1a and FIG. 1b are schematic diagrams of sidelink communication according to an embodiment of this application.
Figure 1B:
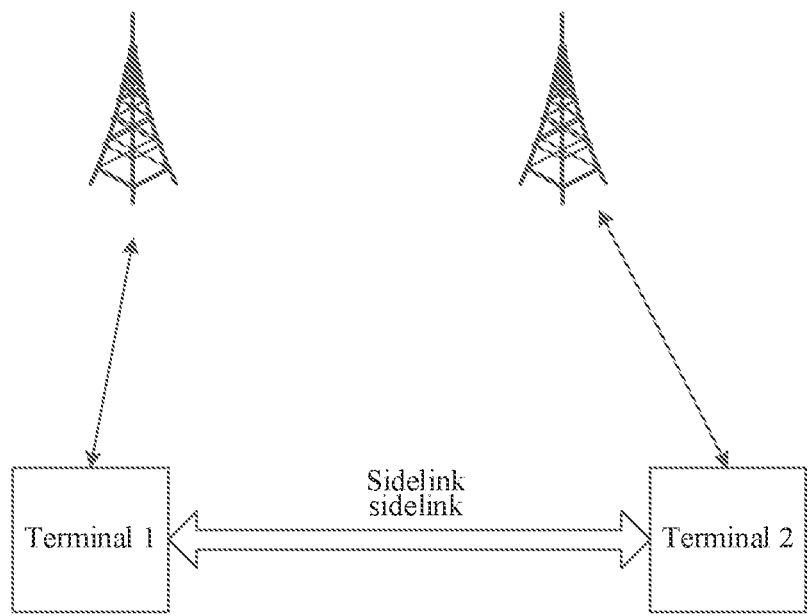
Figure 2A:
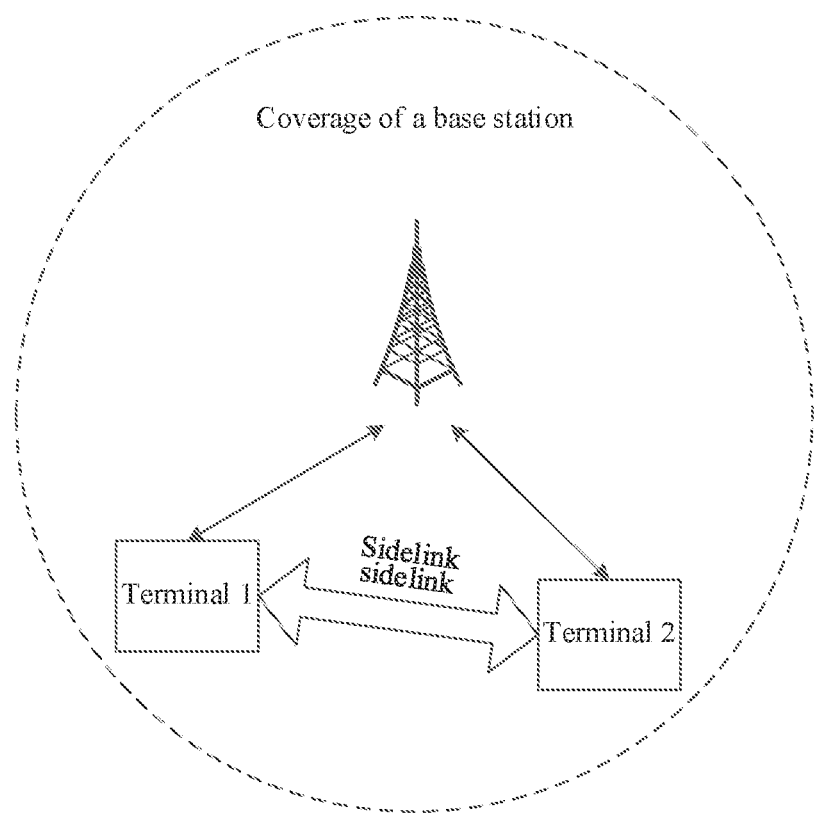
FIG. 2a is a schematic diagram of a mode 1 scenario according to an embodiment of this application.
Figure 2B:
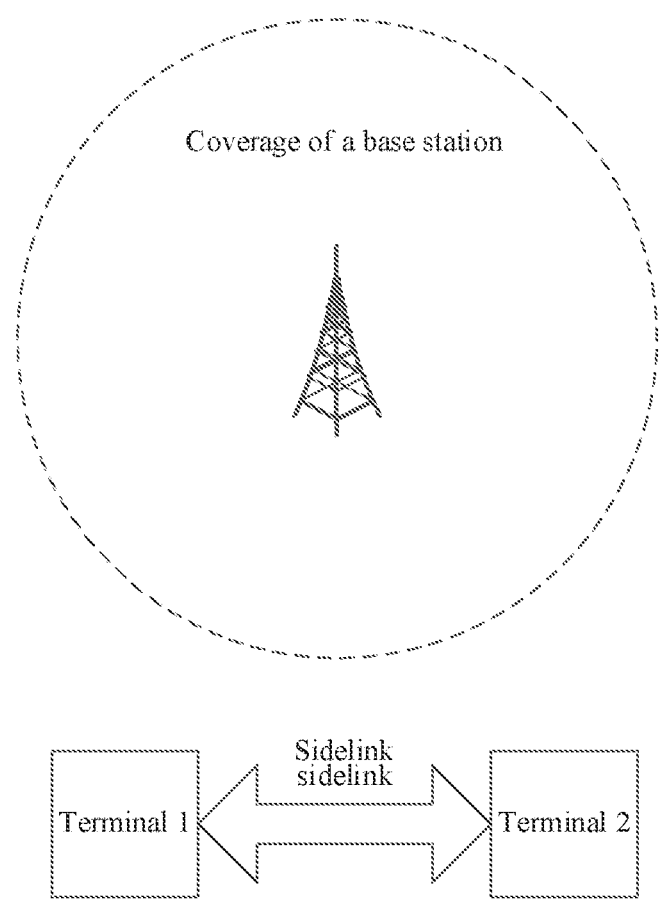
FIG. 2b is a schematic diagram of a mode 2 scenario according to an embodiment of this application.
Figure 3:
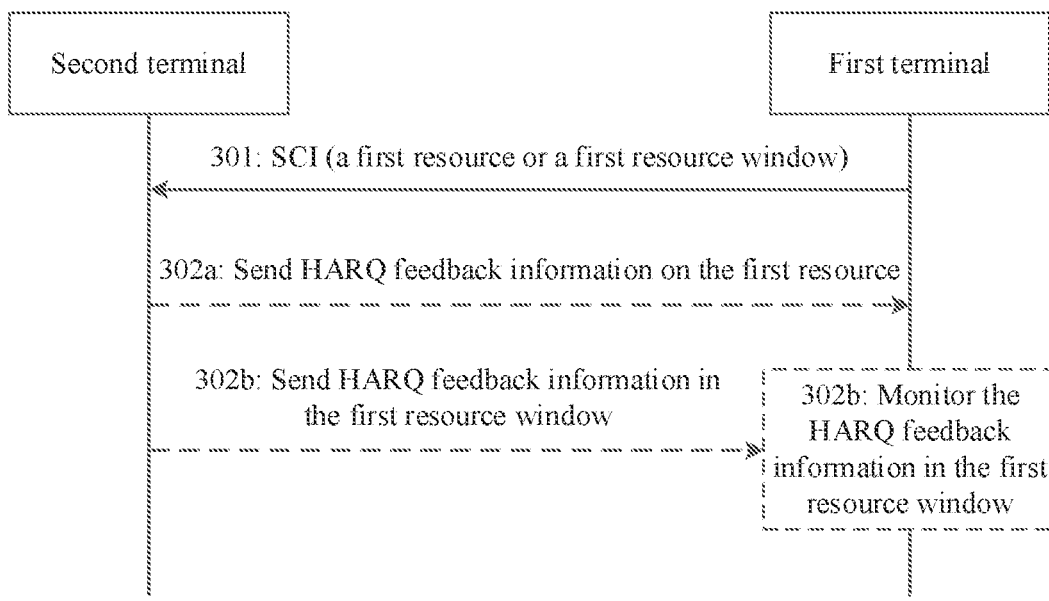
FIG. 3 is a schematic flowchart of a method for determining a feedback resource in a sidelink according to an embodiment of this application.

FIG. 3 is a schematic flowchart of a method for determining a feedback resource in a sidelink according to an embodiment of this application. As shown in FIG. 3, the method may include the following steps.

Step 301: A first terminal sends sidelink control information (sidelink control information, SCI) to a second terminal, where the SCI includes indication information used to indicate a first resource or a first resource window to be occupied for sending HARQ feedback information by the second terminal. The first resource window includes a plurality of candidate first resources.

Figure 4:
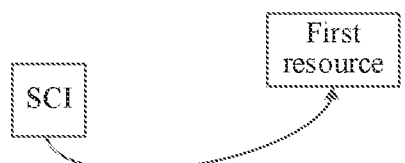
FIG. 4 is a schematic diagram 1 of indicating a first resource by SCI according to an embodiment of this application.

For example, as shown in FIG. 4, the indication information may be used to indicate a time-frequency resource occupied for sending the HARQ feedback information by the second terminal.

Figure 5:
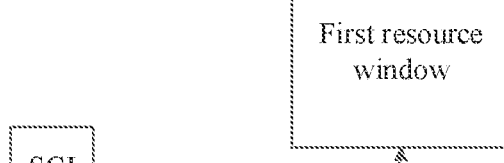
FIG. 5 is a schematic diagram 1 of indicating a first resource window by SCI according to an embodiment of this application.

For another example, the indication information may indicate the second terminal to send the HARQ feedback information in a first resource window shown in FIG. 5. In this case, the second terminal selects a first resource from a plurality of candidate first resources included is the first resource window, and sends the HARQ feedback information.

Step 302a: If the indication information indicates the first resource, the second terminal sends the HARQ feedback information to the first terminal on the first resource. In addition, the first terminal receives the HARQ feedback information on the first resource.

Step 302b: If the indication information indicates the first resource window, the second terminal selects a first resource in the first resource window to send the HARQ feedback information to the first terminal. In addition, because the first terminal does not determine the resource that is in the first resource window and on which the second terminal sends the HARQ feedback information, the first terminal monitors, in the first resource window, Whether the second terminal sends the HARQ feedback information. If the first terminal detects the HARQ feedback information sent by the second terminal, the HARQ feedback information is received.

In the foregoing method embodiment, the first terminal may determine the resource occupied for sending the HARQ feedback information by the second terminal, or the second terminal may select, from the resource window indicated by the first terminal, the resource occupied for sending the HARQ feedback information, to implement a HARQ feedback in sidelink communication.

Especially in a mode 2 scenario, for example, when at least one of the two terminals that communicate with each other is outside coverage of a base station, or when the terminal needs to determine the resource for sending data and HARQ feedback information due to another reason, the second terminal cannot obtain, from a network device, the resource for sending the HARQ feedback information, and the first terminal needs to indicate the first resource or the first resource window for sending the HARQ feedback information.

In a possible implementation, when the indication information is used to indicate the first resource for sending the HARQ feedback information by the second terminal, if another terminal also indicates a HARQ feedback resource by using SCI in a sidelink communication process, before sending the SCI to the second terminal, the first terminal may monitor the SCI sent by the another terminal, determine, based on the monitored SCI, a second resource occupied for sending HARQ feedback information by the another terminal, and then determine, based on the second resource, the first resource for sending the HARQ feedback information by the second terminal.

Specifically, after obtaining the second resource occupied for sending the HARQ feedback information by the another terminal, the first terminal may use a resource different from the second resource as the first resource, to avoid a conflict between the resource for sending the HARQ feedback information by the second terminal and the resource for sending the HARQ feedback information by the another terminal.

The another terminal is a terminal other than the first terminal. Therefore, the another terminal may include the second terminal. For example, the first terminal may detect SCI sent by a third terminal to a fourth terminal, to indicate a resource for sending HARQ feedback information by the fourth terminal. Alternatively, the first terminal may detect SCI sent by the third terminal to the second terminal, to indicate a resource for sending HARQ feedback information by the second terminal to the third terminal. Alternatively, the first terminal may detect SCI sent by the second terminal to the third terminal, to indicate a resource for sending HARQ feedback information by the third terminal.

The foregoing implementation helps avoid a conflict between the first resource occupied for sending the HARQ feedback information by the second terminal to the first terminal and the resource occupied for sending the HARQ feedback information by the another terminal. Especially in a mode 2, the resource occupied for sending the HARQ feedback information is determined by the first terminal. The first terminal may monitor the SCI sent by the another terminal, to obtain the resource occupied for sending the HARQ feedback information by the another terminal. In this way, the conflict between the first resource determined for sending the HARQ feedback information by the second terminal and the resource or sending the HARQ feedback information by the another terminal can be avoided.

In a possible implementation, when the indication information is used to indicate the first resource window for sending the HARQ feedback information by the second terminal, the indication information may include one or more types of the following information: a size of the first resource window, a start position of the first resource window, and an end position of the first resource window.

For example, the first resource window may be determined based on the start position of the first resource window and the size of the first resource window. In this case, the indication information may include the start position of the first resource window and the size of the first resource window. Alternatively, the first resource window may be determined based on the size of the first resource window and the end position of the first resource window. In this case, the indication information may include the size of the first resource window and the end position of the first resource window. Alternatively, the first resource window may be determined based on the start position of the first resource window and the end position of the first resource window. In this case, the indication information may include the start position of the first resource window and the end position of the first resource window.

For another example, one type of the foregoing information may be agreed in advance, for example, may be notified by the first terminal to the second terminal in advance, may be notified by the network device to the second terminal in advance, or may be agreed in advance in a communications protocol. In this case, the indication information only needs to include the other type of information. For example, if the size of the first resource window is agreed in advance, the indication information only needs to include the start position or the end position of the first resource window.

In some embodiments, the network device may send a plurality of candidate sizes of the first resource window to the first terminal, and the first terminal selects one of the plurality of candidate sizes as the size of the first resource window. For example, the network device may send the plurality of candidate sizes of the first resource window to the first terminal by using radio resource control (radio resource control, RRC) signaling, and then the first terminal selects one of the plurality of window values. Alternatively, the network device directly configures one of the plurality of window values for the first terminal, and the first terminal uses the one of the plurality of window values as the size of the first resource window.

After determining the first resource window based on the indication information, the second terminal selects one of the plurality of candidate first resources included in the first resource window as the first resource, and sends the HARQ feedback information to the first terminal on the first resource.

Optionally, when selecting the first resource from the plurality of candidate first resources, the second terminal may consider the second resource for sending the HARQ feedback information by the another terminal, to avoid a conflict between the selected first resource and the second resource.

In some embodiments, the second terminal may monitor an energy value for a resource in the first resource window. If the energy value is greater than a preset threshold, it may be considered that the another terminal sends a message on the resource. If the energy value is not greater than the preset threshold, it may be considered that no other terminal sends a message on the resource. To avoid the conflict between the resource for sending the HARQ feedback information by the second terminal and the resource for sending the message by the another terminal, the second terminal may select the resource whose energy value is not greater than the preset threshold as the first resource for sending the HARQ feedback information.

In a specific embodiment, the second terminal may monitor an energy value on a first candidate first resource in the first resource window, and if the energy value on the first candidate first resource is not greater than the preset threshold, use the first candidate first resource as the first resource for sending the HARQ feedback information. If the energy value on the first candidate first resource is greater than the preset threshold, the second terminal continues to monitor an energy value on a second candidate first resource, and if the energy value on the second candidate first resource is not greater than the preset threshold, uses the second candidate first resource as the first resource for sending the HARQ feedback information. If the energy value on the second candidate first resource is greater than the preset threshold, the second terminal continues to monitor a next candidate first resource until an energy value monitored on an $N^{th}$ candidate first resource is not greater than the preset threshold, and uses the $N^{th}$ candidate first resource as the first resource for sending the HARQ feedback information, where N is an integer greater than or equal to 1.

Optionally, when selecting the first resource from the plurality of candidate first resources, the second terminal may further consider a third resource occupied for sending a message by the second terminal to the another terminal, to avoid a conflict between the selected first resource and the third resource. The message sent by the second terminal to the another terminal may be SCI, data, or HARQ feedback information. This is not limited in this embodiment of this application.

The foregoing method for determining the feedback resource uses a unicast scenario as an example. However, the method may also be applied to a broadcast or multicast scenario in the sidelink communication. To be specific, the SCI sent by the first terminal may be further sent to the another terminal, to indicate the resource occupied for sending the HARQ feedback information by the another terminal. For example, a terminal 1 broadcasts SCI to a terminal 2, a terminal 3, and a terminal 4. The SCI indicates the terminal 1 to send data to the terminal 2, the terminal 3, and the terminal 4 on a resource 1, indicates the terminal 2 to send HARQ feedback information on a resource 2, indicates the terminal 3 to send HARQ feedback information on a resource 3, and indicates the terminal 4 to send HARQ feedback information on a resource 4.

As described above, the foregoing method for determining the feedback resource in the sidelink is particularly applicable to the mode 2 scenario. However, in some scenarios, sidelink communication between the first terminal and the second terminal may be switched between a mode 1 and the mode 2. For example, due to movement of the first terminal and the second terminal, both the first terminal and the second terminal may be within coverage of the network device in a time period, and the first terminal and the second terminal perform sidelink communication in the mode 1; and both the first terminal and the second terminal are outside the coverage of the network device at another moment, and the first terminal and the second terminal perform sidelink communication in the mode 2.

In a possible design, in a mode 1 scenario, the network device may determine the resource for sending the data by the first terminal to the second terminal and the resource for sending the HARQ feedback information by the second terminal to the first terminal for the data, and separately send the resources to the first terminal and the second terminal. In this case, the first terminal and the second terminal respectively transmit the data and the HARQ feedback information on corresponding resources based on an indication of the network device. When the sidelink communication between the first terminal and the second terminal is switched to the mode 2, because the network device cannot determine the sidelink communication resources for the first terminal and the second terminal, the first terminal may determine the resource for sending the data, and the first resource or the first resource window for sending the HARM feedback information by the second terminal for the data, and send the SCI to the second terminal, to notify the second terminal of the determined resources.

In another possible design, regardless of the mode 1 scenario or the mode 2 scenario, the SCI sent by the first terminal to the second terminal may include the indication information, to indicate the first resource for sending the HARQ feedback information by the second terminal. A difference lies in that: In the mode 1 scenario, the network device determines the first resource and sends the first resource to the first terminal, and the first terminal notifies the second terminal of the first resource. In the mode 2 scenario, the first terminal determines the first resource and notifies the second terminal of the first resource.

In a possible implementation, if the first terminal does not receive, on the first resource, the HARQ feedback information sent by the second terminal, or the first terminal does not monitor, in the first resource window, the HARQ feedback information sent by the second terminal, the first terminal considers that the second terminal does not receive the data sent by the first terminal, and determines that the data needs to be resent. In a process of resending the data, the first terminal also first sends SCI, and the SCI is used to indicate a resource for resending the data, and a first resource or a first resource window for sending the HARQ feedback information by the second terminal for the data.

Figure 6:
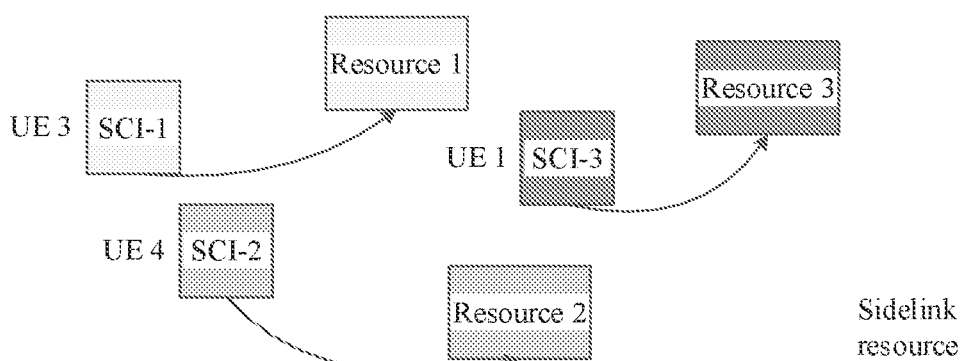
FIG. 6 is a schematic diagram 2 of indicating a first resource by SCI according to an embodiment of this application.
Figure 7:
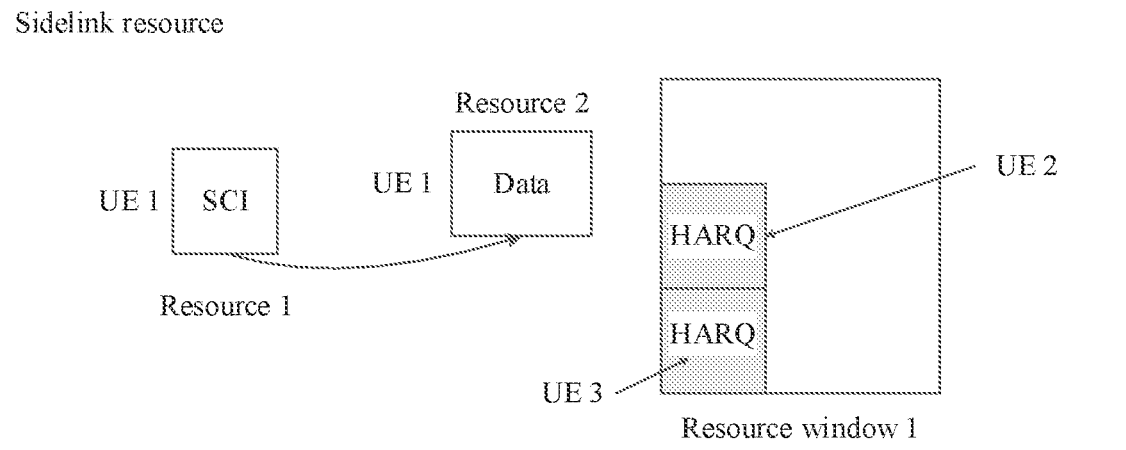
FIG. 7 is a schematic diagram 2 of indicating a first resource window by SCI according to an embodiment of this application.

For clearer understanding of the foregoing embodiments of this application, the following uses examples for description with reference to FIG. 6 and FIG. 7.

Referring to FIG. 6, a terminal 1 monitors, in a sidelink resource pool, SCI sent by another terminal, and monitors SCI-1 sent by a terminal 3 and SCI-2 sent by a terminal 4. A resource that is indicated by the SCI-1 and that is occupied for sending HARQ feedback information is a resource 1. A resource that is indicated by the SCI-2 and that is occupied for sending HARQ feedback information is a resource 2. When the terminal 1 determines that the terminal 1 needs to send data to a terminal 2, and needs to configure, for the terminal 2, a resource for sending HARQ feedback information, to avoid a conflict between the resource occupied for sending the HARQ feedback information by the terminal 2 and a resource for sending HARQ feedback information by the another terminal, in addition to the resource 1 and the resource 2, a resource 3 is selected from the resources as the resource for sending the HARQ feedback information by the terminal 2, and SCI sent to the terminal 2 carries indication information of the resource 3.

After receiving the SCI sent by the terminal 1, the terminal 2 sends the HARQ feedback information to the terminal 1 on the resource 3 based on the received data.

Referring to FIG. 7, a terminal 1 sends SCI to a terminal 2 on a resource 1, and the SCI indicates the terminal 2 to receive data on a resource 2 and send HARQ feedback information in a resource window 1. The terminal 2 receives the data on the resource 2 based on the SCI, and then starts to monitor, on a first resource in the resource window 1, whether an energy value is greater than a preset threshold. Because a terminal 3 sends HARQ feedback information on the first resource in the resource window 1, a monitoring result of the terminal 2 on the first resource is higher than the preset threshold, and the terminal 2 continues to monitor an energy value on a second resource. Because no other terminal sends a message on the resource, the energy value monitored by the terminal 2 on the second resource is not greater than the preset threshold, and the terminal 2 sends the HARQ feedback information to the terminal 1 on the second resource.

However, the terminal 1 cannot know, in advance, a resource on which the terminal 2 sends the HARQ feedback information. Therefore, the terminal 1 monitors, in the resource window 1, whether the terminal 2 sends the HARQ feedback information, to receive the HARQ feedback information sent by the terminal 2. The terminal 1 performs monitoring on the first resource in the resource window 1. If the terminal 1 does not monitor the HARQ feedback information sent by the terminal 2, the terminal 1 continues to perform monitoring on the second resource, and monitors, on the second resource, the HARQ feedback information sent by the terminal 2, in other words, the terminal 1 receives, on the second resource, the HARQ feedback information sent by the terminal 2.

Figure 8:
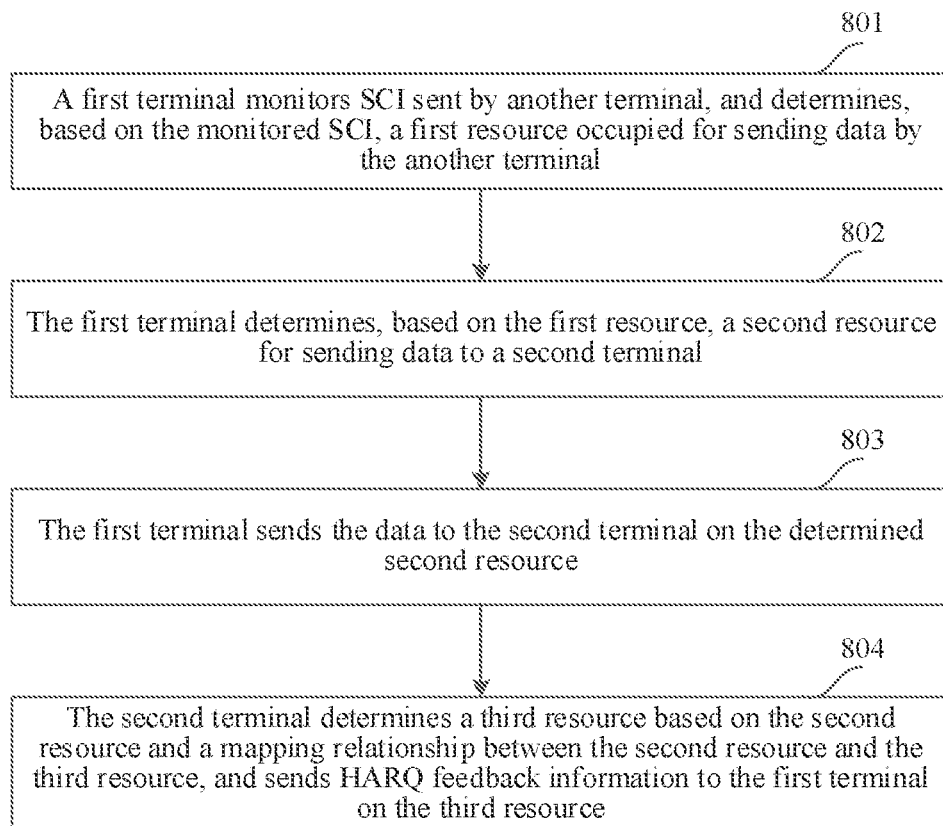
FIG. 8 is another schematic flowchart of another method for determining a feedback resource in a sidelink according to an embodiment of this application.

To enable a receiving end and a transmitting end to determine a HARQ feedback information resource in sidelink communication, an embodiment of this application further provides a method for determining a feedback resource in a sidelink. Referring to FIG. 8, the method may include the following steps.

Step 801: A first terminal monitors SCI sent by another terminal, and determines, based on the monitored SCI, a first resource occupied for sending data by the another terminal.

Step 802: The first terminal determines, based on the first resource, a second resource for sending data to a second terminal.

Specifically, when determining the second resource, the first terminal avoids a conflict between the second resource and the first resource, in other words, there is no intersection between the determined second resource and the first resource for sending the data by the another terminal.

Step 803: The first terminal sends the data to the second terminal on the determined second resource.

Step 804: The second terminal determines a third resource based on the second resource and a mapping relationship between the second resource and the third resource, and sends HARQ feedback information to the first terminal on the third resource for the data.

According to the foregoing mapping relationship, different second resources correspond to different third resources.

Correspondingly, the first terminal receives, on the third resource, the HARQ feedback information sent by the second terminal. Specifically, the first terminal also needs to determine the third resource based on the second resource and the mapping relationship between the second resource and the third resource, and then receive the HARQ feedback information on the third resource. However, an occasion for determining the third resource by the first terminal is not limited in this embodiment of this application. The first terminal may determine the third resource immediately after determining the second resource, or may determine the third resource after sending the data.

In the foregoing embodiment of this application, because there is the mapping relationship between the second resource for sending the data by the first terminal and the third resource for sending the HARQ feedback information by the second terminal, if the second resource for sending the data by the first terminal is different from the resource for sending the data by the another terminal, the resource for sending the HARQ feedback information by the second terminal is also different from the resource for sending the HARQ feedback information by the another terminal. When determining the second resource for sending the data, the first terminal monitors the SCI sent by the another terminal, to avoid a conflict with the resource for sending the data by the another terminal. Therefore, a conflict between the resource for sending the HARQ feedback information by the second terminal and the resource for sending the HARQ feedback information by the another terminal can be avoided.

In the foregoing two methods provided in this application, a terminal may be user equipment (user equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may alternatively be a cellular phone, a cordless telephone set, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

A network device in this embodiment of this application may be a base station, or another device configured to mutually convert a received over-the-air frame and an internet protocol (internet protocol, IP) packet, and used as a router between a wireless terminal and a remaining part of an access network, where the remaining part of the access network may include an IP network. The network device may be further configured to coordinate attribute management of an air interface. In communications systems using different radio access technologies, a device having a base station function may have different names. For example, a base station in an LTE system is referred to as an evolutional node B (evolutional node B, eNB), a base station (gNB) an NR system. This is not limited in the embodiments of this application.

Figure 9:
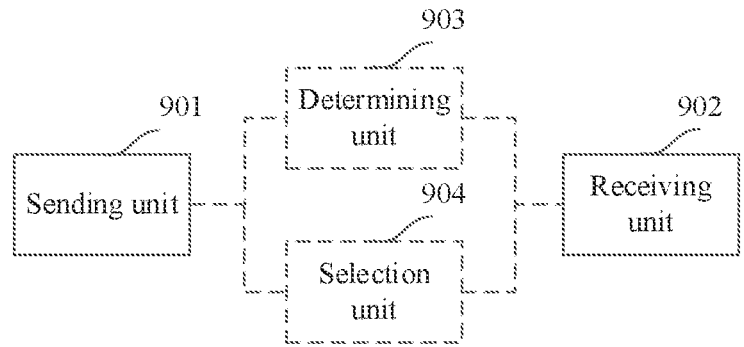
FIG. 9 is a schematic structural diagram 1 of a terminal according to an embodiment of this application.

Based on the same technical concept, an embodiment of this application provides a terminal, configured to implement the function performed by the first device in the foregoing method embodiment. As shown in FIG. 9, the terminal includes a sending unit 901 and a receiving unit 902, and may further include a determining unit 903 and a selection unit 904.

The sending unit 901 is configured to send SCI to a second terminal, where the SCI includes indication information, the indication information is used to indicate a first resource or a first resource window to be occupied for sending HARQ feedback information by the second terminal, and the first resource window includes a plurality of candidate first resources.

The receiving unit 902 is configured to: receive, on the first resource, the HARQ feedback information sent by the second terminal, or monitor, in the first resource window, the HARQ feedback information sent by the second terminal.

In a possible implementation, when the indication information is used to indicate the first resource occupied for sending the HARQ feedback information by the second terminal, before the sending unit 901 sends the SCI to the second terminal, the receiving unit 902 is further configured to monitor SCI sent by another terminal. The terminal further includes a determining unit 903, configured to: determine, based on the monitored SCI, a second resource occupied for sending HARQ feedback information by the another terminal, where the another terminal is a terminal other than the first terminal; and determine the first resource based on the second resource.

In a possible implementation, when the indication information is used to indicate the first resource window for sending the HARQ feedback information by the second terminal, the indication information includes one or more types of the following information: a size of the first resource window a start position of the first resource window, and an end position of the first resource window.

In a possible implementation, when the first message is used to indicate the first resource window for sending the HARQ feedback information by the second terminal, the receiving unit 902 is further configured to: receive the size of the first resource window that is sent by a network device, or receive a plurality of candidate sizes of the first resource window that are sent by a network device. The terminal further includes a selection unit 904, configured to select the size of the first resource window from the plurality of candidate sizes of the first resource window.

In a possible implementation, the terminal and/or the second terminal are/is outside coverage of the network device.

Figure 10:
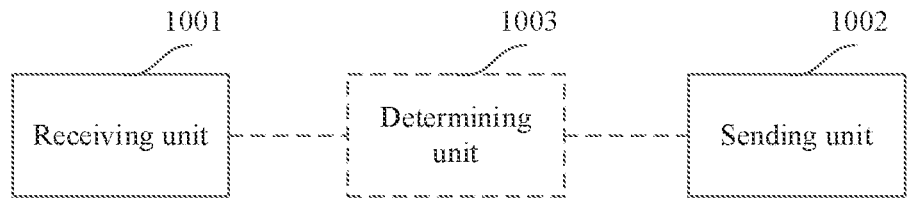
FIG. 10 is a schematic structural diagram 2 of a terminal according to an embodiment of this application.

Based on a same technical concept, an embodiment of this application provides a terminal, configured to implement a function performed by the second terminal in the method embodiment. As shown in FIG. 10, the terminal includes a receiving unit 1001 and a sending unit 1002, and may further include a determining unit 1003.

The receiving unit 1001 is configured to receive SCI sent by a first terminal, where the SCI includes indication information, the indication information is used to indicate a first resource or a first resource window to be occupied for sending HARQ feedback information by the second terminal, and the first resource window includes a plurality of candidate first resources.

The sending unit 1002 is configured to: send the HARQ feedback information to the first terminal on the first resource, or send the HARQ feedback information to the first terminal in the first resource window.

In a possible implementation, when the indication information is used to indicate the first resource window for sending the HARQ feedback information by the second terminal, the indication information includes one or more types of the following information: a size of the first resource window a start position of the first resource window, and an end position of the first resource window.

In a possible implementation, the sending unit 1002 is specifically configured to send the HARQ feedback information to the first terminal on a first resource in the first resource window, where an energy value monitored by the receiving unit 1001 on the first resource is not greater than a preset threshold.

In a possible implementation, the receiving unit 1001 is specifically configured to: monitor an energy value on a first candidate first resource in the first resource window, and if the energy value on the first candidate first resource is not greater than the preset threshold, use the first candidate first resource as the first resource, or if the energy value on the first candidate first resource is greater than the preset threshold, monitor an energy value on a second candidate first resource in the first resource window, until an energy value monitored on an $N^{th}$ candidate first resource is not greater than the preset threshold, and use the $N^{th}$ candidate first resource as the first resource, where N is an integer greater than or equal to 1.

In a possible implementation, the terminal further includes a determining unit 1003, configured to determine a third resource occupied for sending data by the second terminal to a third terminal; and determine the first resource based on the third resource.

In a possible implementation, the first terminal and/or the second terminal are/is outside coverage of a network device.

It should be noted that the division of the units is merely logical function division. In actual implementation, all or some of the units may be integrated into a physical entity, or the units may be physically separate. In addition, all of the units may be implemented in a form of software invoked by a processing element, or implemented in a form of hardware. Alternatively, some of the units may be implemented in a form of software invoked by a processing element, and some of the units may be implemented in a form of hardware. For example, the receiving unit and the sending unit may be integrated together, or may be implemented independently. The processing element described herein may be an integrated circuit with a signal processing capability. In an implementation process, steps of the foregoing method or the foregoing units may be implemented by using an integrated logical circuit of hardware in the processor element, or by using an instruction in a form of software. In addition, the sending unit is a sending control unit, and may send information through a transmit apparatus, such as an antenna and a radio frequency apparatus. Likewise, the receiving unit may also receive information through a receiving apparatus, such as an antenna and a radio frequency apparatus.

The foregoing units may be configured as one or more integrated circuits for performing the foregoing methods, for example, one or more application-specific integrated circuits (application-specific integrated circuit, ASIC), one or more microprocessors, or one or more field programmable gate arrays (field programmable gate array, FPGA). For another example, when one of the foregoing units is implemented by a processing element by scheduling a program, the processing element may be a general-purpose processor, for example, a central processing unit (Central Processing Unit, CPU) or another processor that can invoke a program. For still another example, the units may be integrated and implemented in a form of a system-on-a-chip (system-on-a-chip, SOC).

Figure 11:
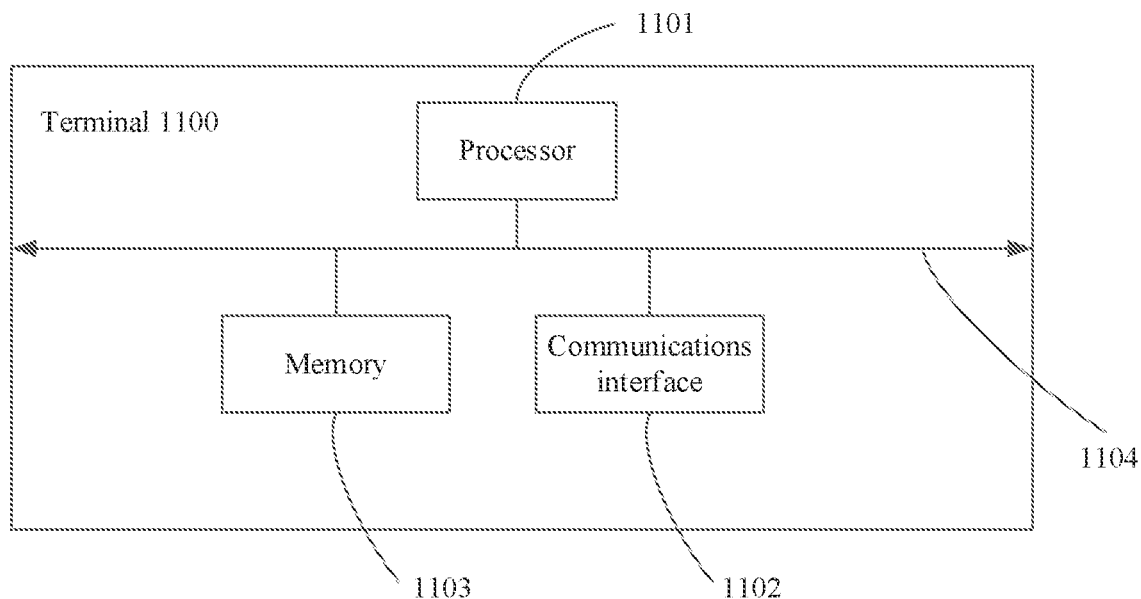
FIG. 11 is a schematic structural diagram 3 of a terminal according to an embodiment of this application.

Based on the same technical concept, an embodiment of this application provides a terminal, configured to implement the function performed by the first terminal in the foregoing method embodiment. As shown in FIG. 11, the terminal 1100 includes a processor 1101 and a communications interface 1102. Further, the terminal 1100 may further include a memory 1103.

Specifically, the processor 1101 may be a general-purpose CPU, a microprocessor, an ASIC, or one or more integrated circuits configured to control program execution of the solutions of this application.

The communications interface 1102 is configured to communicate with another device or a communications network, such as an Ethernet, a radio access network (radio access network, RAN), or a wireless local area network (wireless local area networks, WLAN) through any apparatus such as a transceiver.

The communications bus 1104 may include a path used to transmit information between the foregoing components.

The memory 1103 may be a read-only memory (read-only memory, ROM) or another type of static storage device capable of storing static information and an instruction, a random access memory (random access memory, RAM) or another type of dynamic storage device capable of storing information and an instruction, or may be an electrically erasable programmable read-only memory (electrically erasable programmable read-only memory, EEPROM), or any other medium capable of carrying or storing expected program code in a form of an instruction or a data structure and capable of being accessed by a computer, but is not limited thereto. The memory 1103 may exist independently, for example, an off-chip memory, and is connected to the processor 1101 by using the communications bus 1104. Alternatively, the memory 1103 may be integrated with the processor 1101.

The communications interface 1102 is responsible for communicating with another device or a communications network. The processor 1101 is configured to implement another function in the communication method provided in the foregoing embodiment of this application.

In specific implementation, in an embodiment, the processor 1101 may include one or more CPUs.

During specific implementation, in an embodiment, the terminal may include a plurality of processors. Each of the processors may be a single-core processor, or may be a multi-core processor. The processor herein may refer to one or more devices, circuits, and/or processing cores configured to process data (for example, a computer program instruction).

Figure 12:
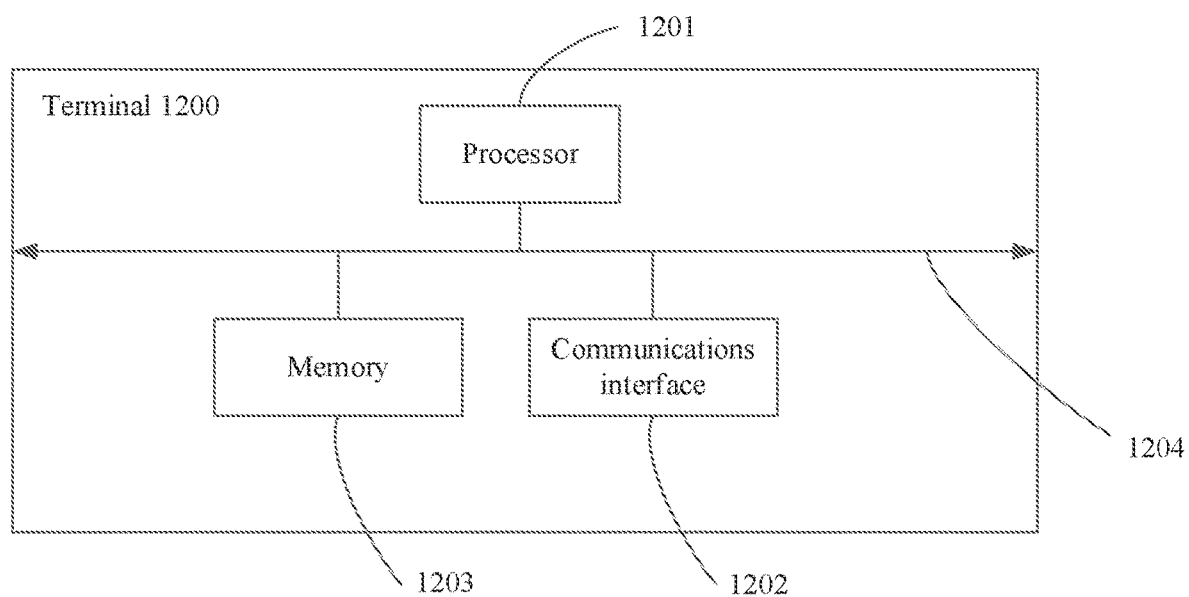
FIG. 12 is a schematic structural diagram 4 of a terminal according to an embodiment of this application.

Based on the same technical concept, an embodiment of this application provides a terminal, configured to implement the function performed by a second terminal in the foregoing method embodiment. As shown in FIG. 12, the terminal 1200 includes a processor 1201 and a communications interface 1202. Further, the terminal 1200 may further include a memory 1203.

Specifically, the processor 1201 may be a general-purpose CPU, a microprocessor, an ASIC, or one or more integrated circuits configured to control program execution of the solutions of this application.

The communications interface 1202 is configured to communicate with another device or a communications network, such as an Ethernet, a radio access network (radio access network, RAN), or a wireless local area network (wireless local area networks, WLAN) through any apparatus such as a transceiver.

The communications bus 1204 may include a path used to transmit information between the foregoing components.

The memory 1203 may be a read-only memory (read-only memory, ROM) or another type of static storage device capable of storing static information and an instruction, a random access memory (random access memory, RAM) or another type of dynamic storage device capable of storing information and an instruction, or may be an electrically erasable programmable read-only memory (electrically erasable programmable read-only memory, EEPROM), or any other medium capable of carrying or storing expected program code in a form of an instruction or a data structure and capable of being accessed by a computer, but is not limited thereto. The memory 1203 may exist independently, for example, an off-chip memory, and is connected to the processor 1201 by using the communications bus 1204. Alternatively, the memory 1203 may be integrated with the processor 1201.

The communications interface 1202 is responsible for communicating with another device or a communications network. The processor 1201 is configured to implement another function in the communication method provided in the foregoing embodiment of this application.

In specific implementation, in an embodiment, the processor 1201 may include one or more CPUs.

During specific implementation, in an embodiment, the terminal may include a plurality of processors. Each of the processors may be a single-core processor, or may be a multi-core processor. The processor herein may refer to one or more devices, circuits, and/or processing cores configured to process data (for example, a computer program instruction).

A person skilled in the art should understand that the embodiments of this application may be provided as a method, a system, or a computer program product, Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and; or a block in the flowcharts and/or the block diagrams. These computer program instructions may be provided to a processor of a general-purpose computer, a special-purpose computer, an embedded processor, or another programmable data processing device to generate a machine, so that an instruction that is executed by a processor of a computer or another programmable data processing device generates an apparatus configured to implement a specified function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that, a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:

1. A method for determining a feedback resource in a sidelink, the method comprising:
    sending, using a first resource, data from a first terminal to a second terminal;
    determining, based on a mapping relationship between the first resource and a second resource, the second resource or a first window including the second resource;
    either receiving hybrid automatic repeat request (HARQ) feedback information from the second terminal on the second resource or monitoring resources in the first window for the HARQ feedback information from the second terminal;
    monitoring sidelink control information (SCI) from another terminal;
    determining, based on the SCI, a third resource for the other terminal to send data; and
    determining the first resource based on the third resource.

2. The method of claim 1, wherein either receiving hybrid automatic repeat request (HARQ) feedback information from the second terminal on the second resource or monitoring resources in the first window for the HARQ feedback information from the second terminal comprises receiving hybrid automatic repeat request (HARQ) feedback information from the second terminal on the second resource, and wherein at least one of the first terminal or the second terminal is outside of a coverage area of a network device.

3. The method of claim 1, wherein the other terminal is a terminal other than the first terminal and the second terminal.

4. The method of claim 1, wherein the SCI comprises indication information, and wherein the indication information indicates the third resource.

5. The method of claim 4, wherein the indication information further indicates a second window including the third resource, and wherein the indication information indicates one or more of a size of the second window, a start location of the second window, or an end location of the second window.

6. The method of claim 4, further comprising:
    monitoring a first message from the other terminal, wherein the first message indicates a fourth resource for the other terminal to send the first message; and
    determining the first resource based on the fourth resource.

7. The method of claim 4, wherein at least one of the first terminal or the second terminal is outside of a coverage area of a network device.

8. The method of claim 1, wherein either receiving hybrid automatic repeat request (HARQ) feedback information from the second terminal on the second resource or monitoring resources in the first window for the HARQ feedback information from the second terminal comprises monitoring resources in the first window for the HARQ feedback information from the second terminal, and wherein at least one of the first terminal or the second terminal is outside of a coverage area of a network device.

9. A first terminal, comprising:
    a memory configured to store one or more programs; and
    a processor coupled to the memory and configured to execute the one or more programs to cause the first terminal to:
        send, using a first resource, data to a second terminal;
        determine, based on a mapping relationship between the first resource and a second resource, a second resource or a first window including the second resource;
        either receive hybrid automatic repeat request (HARQ) feedback information from the second terminal on the second resource, or monitor resources in the first window for the HARQ feedback information from the second terminal;
        monitor sidelink control information (SCI) from another terminal;
        determine, based on the SCI, a third resource for the other terminal to send data; and
        determine the first resource based on the third resource.

10. The first terminal of claim 9, wherein when the processor is configured to either receive hybrid automatic repeat request (HARQ) feedback information from the second terminal on the second resource or monitor resources in the first window for the HARQ feedback information from the second terminal, the processor is configured to cause the first terminal to receive hybrid automatic repeat request (HARQ) feedback information from the second terminal on the second resource, and wherein at least one of the first terminal or the second terminal is outside of a coverage area of a network device.

11. The first terminal of claim 9, wherein the other terminal is a terminal other than the first terminal and the second terminal.

12. The first terminal of claim 9, wherein the SCI comprises indication information, and wherein the indication information indicates the first resource.

13. The first terminal of claim 12, wherein the indication information further indicates a second window including the third resource, and wherein the indication information indicates one or more of a size of the second window, a start location of the second window, or an end location of the second window.

14. The first terminal of claim 12, wherein the processor is further configured to cause the first terminal to:
    monitor a first message from the other terminal, wherein the first message indicates a fourth resource for the other terminal to send the first message; and
    determine the first resource based on the fourth resource.

15. The first terminal of claim 12, wherein at least one of the first terminal or the second terminal is outside of a coverage area of a network device.

16. A method for determining a feedback resource in a sidelink, the method comprising:
    sending a first message including data from a first terminal to a second terminal;
    determining, based on a mapping relationship between the first message and a second message, the second message or a first window of the second message;
    either receiving hybrid automatic repeat request (HARQ) feedback information from the second terminal on the second message, or monitoring the first window for the HARQ feedback information from the second terminal; and
    monitoring sidelink control information (SCI) from another terminal,
    wherein the other terminal is a terminal other than the first terminal and the second terminal.

17. The method of claim 16, further comprising:
    determining, based on the SCI, a first resource for the other terminal to send data; and
    determining the first message based on the first resource.

18. The method of claim 17, wherein the SCI comprises indication information, and wherein the indication information indicates the first resource.

19. The method of claim 18, wherein the indication information further indicates a second window of the first resource, and wherein the indication information indicates one or more of a size of the second window, a start location of the second window, or an end location of the second window.

20. The method of claim 16, further comprising:
monitoring a third message from the other terminal, wherein the third message indicates a first resource occupied by the other terminal for sending the third message; and
determining the first message based on the first resource.

* * * * *